UNITED STATES PATENT OFFICE.

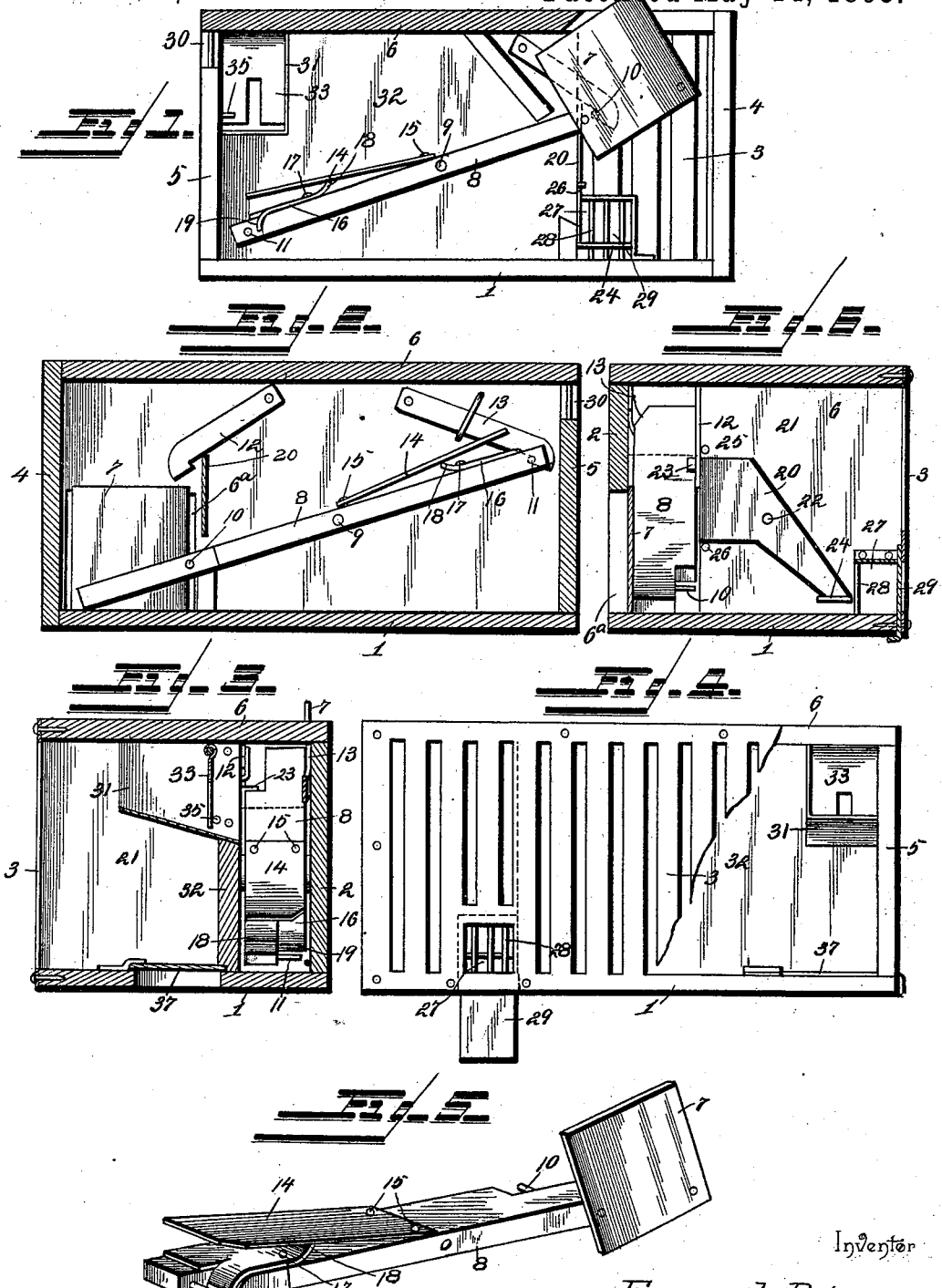

EMANUEL PETERS, OF GUIDE ROCK, NEBRASKA.

ANIMAL-TRAP.

SPECIFICATION forming part of Letters Patent No. 539,083, dated May 14, 1895.

Application filed February 23, 1895. Serial No. 539,399. (No model.)

*To all whom it may concern:*

Be it known that I, EMANUEL PETERS, a citizen of the United States, residing at Guide Rock, in the county of Webster and State of Nebraska, have invented a new and useful Animal-Trap, of which the following is a specification.

This invention relates to an improvement in animal traps, and is particularly adapted for catching smaller animals, such as mice, rats, &c.

The object of my invention is to construct a trap which shall be simple and inexpensive in construction, strong and durable in practice, not liable to get out of order, and which is adapted to be operated by the weight of the animal for resetting the trap, thus adapting the same to catch in succession a number of mice, &c.

My invention consists in the combination with a suitable box provided upon one side with a perforate metal plate, of a centrally pivoted tilting platform, provided at either end with a latch for holding said platform tilted in either direction; in the combination with said tilting platform of two separate and independent levers adapted to disengage the latches for releasing the ends of the tilting platform, and in certain features and details of construction and arrangement hereinafter fully described and pointed out in the claims.

In the drawings, Figure 1 is a front elevation of my improved trap with the front board thereof removed to show the tilting platform and the pivoted latch for engaging the latter. Fig. 2 is a longitudinal section through the trap, taken just inside of the tilting platform. Fig. 3 is a vertical transverse section through one end of the trap. Fig. 4 is a rear elevation of the trap with the perforate metal plate partly broken out to show the interior. Fig. 5 is a perspective view of the tilting platform. Fig. 6 is a vertical transverse section through the end of the trap opposite to that shown in Fig. 3.

Similar numerals of reference indicate corresponding parts in all the figures of the drawings.

Referring to the drawings, 1 indicates the bottom board of my improved trap, 2 the front board, and 3 the rear perforated metal plate, 4 and 5 indicate end boards, and 6 the top, all of which, with the exception of the perforated plate 3 at the back, may be made of wood, or any other preferred material.

6ª indicates an opening through the front board 2, constituting the mouth or entrance to the trap, and 7 is a door attached to one end of a pivoted and tilting platform 8 and carried thereby. The platform 8 is pivoted at or near the center of its length upon a pin or short transverse shaft 9, and has at either end a pin, the one 10 at the forward end of the platform extending rearwardly, and the other pin 11 at the rear end of the platform extending forward, as indicated in the drawings.

12 indicates a latch pivoted near the forward end of the tilting platform 8, and adapted to engage the pin 10 when said end of the platform is elevated, and 13 is a similar latch pivoted to the front board of the trap near the rear end of the tilting platform, which is adapted to engage the pin 11, for upholding the platform at this end, when the latter is tilted.

14 indicates a flat plate pivoted by means of suitable pins 15 to and upon the upper face of the tilting platform. Beneath the free end of the plate 14 and the rear end of the tilting platform is located a rock plate 16 secured to the upper side of the tilting platform by means of suitable pins 17. The forward end of the rocking plate 16 is upturned to a point 18, and rounded off at its opposite end, as at 19, where it rests beneath the pivoted latch 13. When the plate 14 is depressed, the plate 16 will be rocked upon its pivot, its outer end rising and lifting the pivoted latch 13 out of engagement with the pin 11, thereby releasing the rear end of the tilting platform, and allowing it to descend under the weight of the animal. This throws the other end of the tilting platform up until it is engaged by the latch 12.

20 indicates a lever pivoted to the transverse wall 21 within the trap at or near its center, as shown at 22. The lever 20 is provided at one end with a lip or spur 23 underlying the pivoted latch 12. The other end of the lever 20 is provided with a lateral extension in the form of a foot piece 24 located just in front of the bait box. Pins 25 and 26 limit the upward and downward movement of the lever 20, and serve to retain said lever always in proper position. When the animal steps upon the foot piece 24, he thereby rocks the lever 20, lifts the latch 12, and releases the forward end of the tilting platform which falls carrying with it the door 7 thereby closing the mouth or opening 6ª through which it enters the trap.

The door 7 is preferably made of metal, which prevents the animal from gnawing its way out of the trap, and at the same time serves to weight the forward end of the tilting platform which can thus descend quickly.

27 indicates the bait box or receptacle located just behind the foot piece 24 on the lever 20, and provided at its forward end with a series of pins 28 for protecting the bait, and having at its rear end a sliding door 29 through which the bait may be inserted. The small opening 30 is cut through the end board 5 near the upper forward corner thereof, and guards or wires supplied thereto for a purpose which will appear.

31 indicates an inclined chute or passage, affording communication between the portion of the trap containing the tilting platform and another compartment separated therefrom, by means of interiorly arranged partitions 32 and 21. This chute 31 is given an upward inclination, as indicated in Fig. 3, and provided at or near the lower front end thereof with a pivoted door 33 hinged at its upper end in close proximity by the top board 6 of the trap. The door 33 is also provided with a notch or small opening extending inwardly from its lower edge which serves as an observation hole. The door 33 is capable of opening rearwardly, but its movement forward is limited by a pin or stop 35, as shown.

37 indicates a door through the bottom 1 of the trap for releasing the animals from the trap.

The operation of my trap is as follows: The mouse enters the trap through the opening 6ª, and in attempting to get at the bait steps upon the foot piece 24 thereby rocking the lever 20 and releasing the forward end of the tilting platform 8, which allows the door 7 to drop into place and shut off egress. The mouse, in trying to get out of the trap, sees the light coming through the opening 30 and traverses the inclined platform 8, and reaching the rear end thereof, steps upon the plate 14 thereby releasing the rear end of the tilting platform which descends, thereby resetting the trap, or raising the door 7. The mouse in trying to escape, will now enter and pass through the chute 31, when the door 33 will fall behind him preventing his retreat. His only course is to enter the large compartment between the internally arranged partition, above referred to, and the rear perforate plate 3, where he is held captive until released through the door 37.

What I claim is—

1. In an animal trap, an inlet opening, a tilting platform provided with a pin or hook at either end, and a door carried by said platform, in combination with a pivoted latch at the forward end of said tilting platform, a pivoted lever for releasing said latch, another latch located at the rear end of the tilting platform, a rocking plate or lever mounted on and carried by the tilting platform for releasing said latch, and a pivoted plate for operating said rocking plate or lever, all arranged for joint operation, substantially as described.

2. In an animal trap, an inlet opening, a tilting platform, and a door carried thereby, in combination with a pivoted latch for upholding the forward end of the platform, a releasing mechanism therefor, another latch for upholding the rear end of the platform, and means adapted to be operated by the weight of the animal for releasing said latch, substantially as and for the purpose described.

In testimony that I claim the foregoing as my own I have hereto affixed my signature in the presence of two witnesses.

EMANUEL PETERS.

Witnesses:
 N. M. DOUDNA,
 A. J. HAYES.